United States Patent [19]
Mottu et al.

[11] 3,790,296
[45] Feb. 5, 1974

[54] DEVICE FOR THE DRIVING OF A TOOL BY MEANS OF THE SPINDLE OF A MACHINE-TOOL

[75] Inventors: Andre Mottu; Arnold Heimann, both of Geneva, Switzerland

[73] Assignee: Societe Genevoise D'Instruments De Physique, Geneva, Switzerland

[22] Filed: Oct. 12, 1971

[21] Appl. No.: 188,214

[52] U.S. Cl. .................................. 408/239, 279/103
[51] Int. Cl. ........................................... B23b 31/04
[58] Field of Search ........... 408/239, 238, 231, 233; 90/11 A; 279/103, 83, 1 A, 1 R, 76

[56] References Cited
UNITED STATES PATENTS

| | | | |
|---|---|---|---|
| 3,603,203 | 9/1971 | Rhodes .............................. | 90/11 A |
| 3,586,343 | 6/1971 | Reed ................................... | 279/103 |
| 3,691,883 | 9/1972 | Ingram ................................ | 279/83 |

*Primary Examiner*—Gil Weidenfeld
*Attorney, Agent, or Firm*—Ross, Ross & Flavin

[57] ABSTRACT

Device for the driving of a tool by means of the spindle of a machine-tool in which one of the two elements — spindle-tip of the machine and tool — is provided with at least one axial lug engaging in a matched groove of the other element so as to ensure the driving of the tool by means of the spindle independently of the friction drive which exists between the taper of the tool and the tapered bore of the spindle, characterized by the fact that one of the elements — spindle-nose and tool — carries a part set up onto it so as to be angularly adjustable, this part being provided with said lug or groove, the whole being so arranged that the angular position of the spindle relative to the tool is adjustable when the latter is set up into the spindle and when said lug fits into said groove.

1 Claim, 14 Drawing Figures

PATENTED FEB 5 1974

3,790,296

INVENTORS
ANDRÉ MOTTU &
ARNOLD HEIMANN
BY Kenwood Ross &
Chester E. Flavin
ATTORNEYS

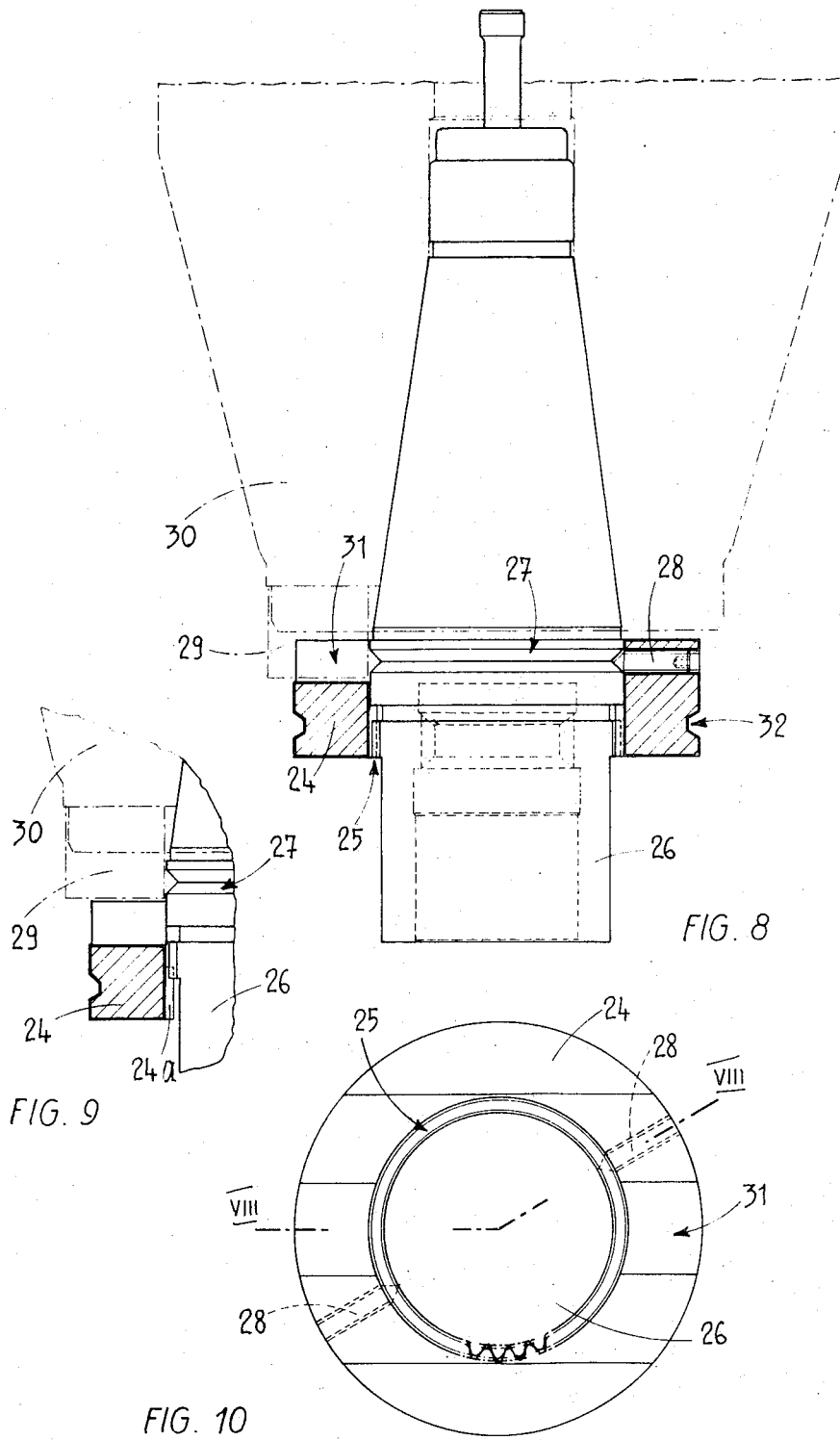

DEVICE FOR THE DRIVING OF A TOOL BY MEANS OF THE SPINDLE OF A MACHINE-TOOL

The present invention concerns a device for the driving of a tool by means of the spindle of a machine-tool in which one of the two elements — spindle-tip of the machine and tool — is provided with at least one axial lug engaging in a matched groove of the other element so as to ensure the driving of the tool by means of the spindle independently of the friction drive which exists between the taper of the tool and the tapered bore of the spindle.

When making borings by machining, the removal of the tool, at the end of the machining, requires the tool to be first laterally displaced, in the direction of the center of the boring, so that the wall of the latter should not be damaged by its point. Some machine-tools which are provided with means permitting such lateral displacements of the tool at the end of the machining operation also comprise a device for stopping the spindle in a determined angular position, so that the lateral displacement of the tool has the effect of bringing its point closer to the center of the boring, that is to say, further apart from the freshly machined boring walls.

Such machines can only be used when they are also provided with a driving device, such as the one mentioned above, which prevents any angular sliding of the tool into the spindle. Further, they can only be used with monolithic tools and not with compound-tools such as those comprising, for instance, an adaptor fitting the tapered bore of the spindle, an extension or a reduction screwed onto this adaptor and a tool-carrying head screwed onto the extension or the reduction. In such compound-tools, the angular position of the tool point with regard to the adaptor is undetermined and varies from one compound-tool to the other.

The object of the present invention is to permit using compound-tools on machine-tools which are provided with means for the side displacement of the tool when at the end of the machining operations.

The driving device according to the invention is characterized by the fact that one of the elements — spindle-nose and tool — carries a part set up onto it so as to be angularly adjustable, this part being provided with said lug or groove, the whole being so that the angular position of the spindle relative to the tool be adjustable when the latter is set up into the spindle and when said lug fits into said groove.

The drawing represents, as an example, one preferred embodiment of the invention and some modifications.

FIG. 8 is an elevation view and a partial sectional view, along line VIII—VIII of FIG. 10, of another modification.

FIG. 9 is a sectional view of a detail of this modification in another position.

FIG. 10 is a plan view of a detail of this modification.

Figure 1:
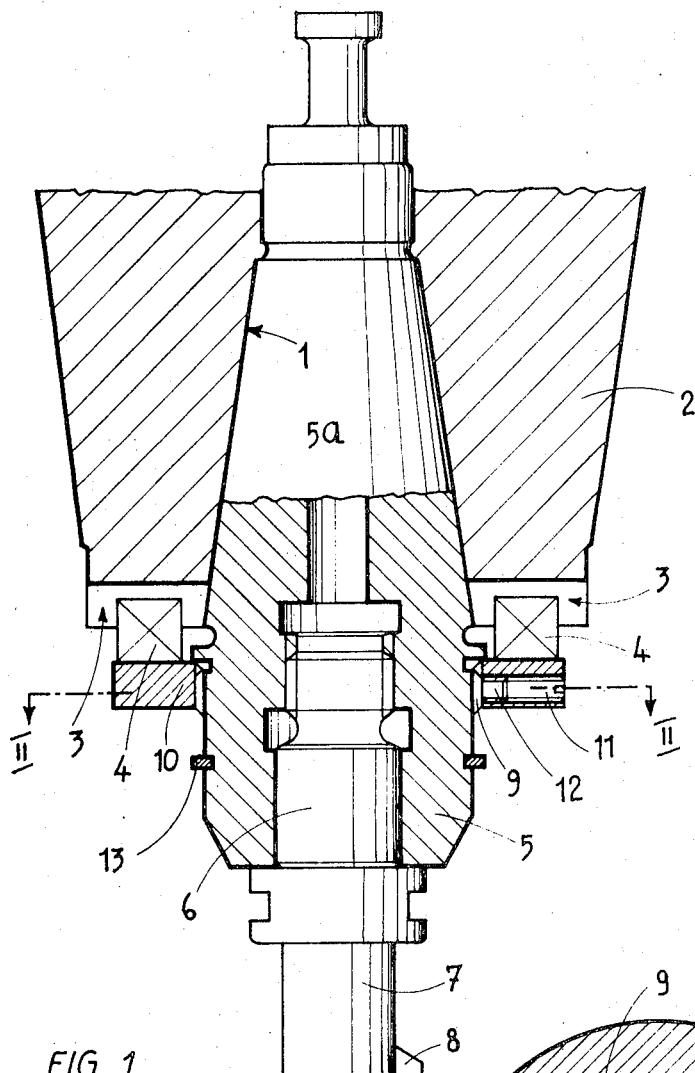
FIG. 1 is an axial section of the spindle end of a machine-tool provided with a cutting tool.
Figure 2:
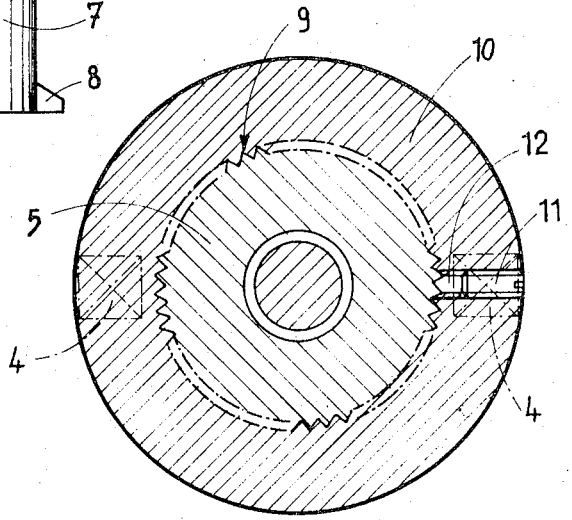
FIG. 2 is a transverse section thereof along line II—II of FIG. 1.

In the embodiment of FIG. 1 and 2, the spindle-nose of a machine-tool, provided with a tapered boring 1, is indicated by 2. This spindle-nose is provided, on its front axial side, with two radial grooves 3, along the same diameter, for accommodating the driving lugs 4 belonging to the tool. The latter is a compound-tool and comprises an adaptor 5, the taper 5a of which fits into the spindle boring 1, an extension 6 and a tool-carrying head 7; the tool blade is indicated by 8.

Adaptor 5 is provided, on its external side, with a star-toothing 9 which meshes with the corresponding internal toothing of a ring 10 having lugs 4. This ring is provided with a radial screw 11 for driving into the toothing 9 a key 12 which slides radially in the ring and prevents the latter from moving axially on the adaptor 5. This arrangement allows, by untightening screw 11, to release ring 10 for moving it axially downward, hence disengaging its internal toothing 9, for modifiying its angular position with respect to the adaptor.

An elastic ring 13, carried by the adaptor 5, prevents the ring being removed from the latter.

Owing to the present arrangement, the angular position of lugs 4 with respect to the adaptor can be modified in reason of the angular position of the tool blade 8, this position being only determined after the mounting together of the various tool parts. It results from this that the ring 10 can be mounted on the adaptor 5 in the proper angular position for having the tool blade correctly oriented when the spindle stops in a position controlled by the machine.

Figure 3:
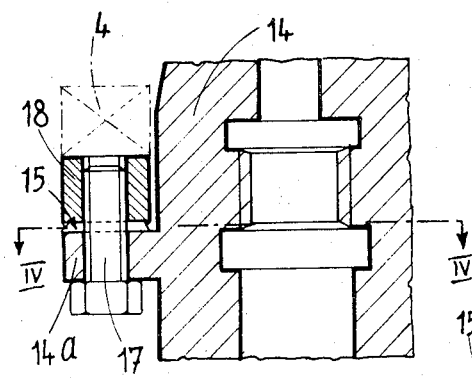
FIG. 3 is a sectional view of a part of a modification.
Figure 4:
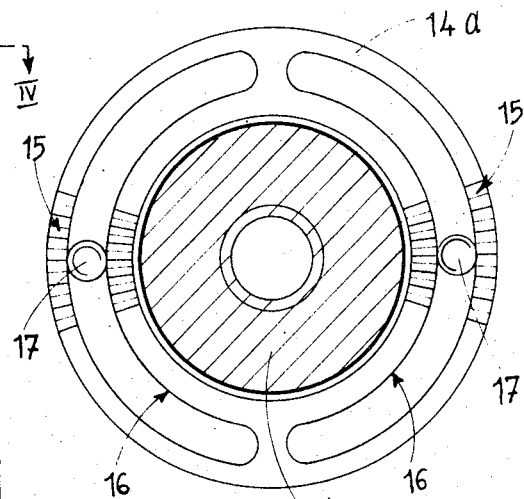
FIG. 4 is a sectional view along line IV—IV of FIG. 3.
Figure 5:
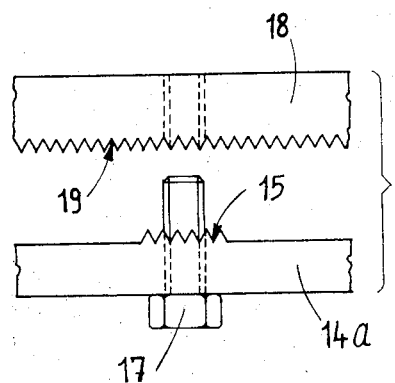
FIG. 5 is an elevation view of a part of this modification.

In the modification of FIG. 3 to 5, the adaptor indicated by 14, is provided with an external annular shoulder 14a the upper axial side of which has two segments 15 with a contrate toothing. This shoulder 14a is provided with two semi-circular grooves 16 (FIG. 4) through which are driven two screws 17 in a direction parallel to the tool axis and fitting into a ring 18 having, on its axial side facing shoulder 14a, a contrate toothing 19.

When the screws 17 are tightened, the ring 18, carrying the lugs 34 which cooperate with the spindle-nose, is angularly locked to the shoulder 14a of the adaptor 14.

Figure 6:
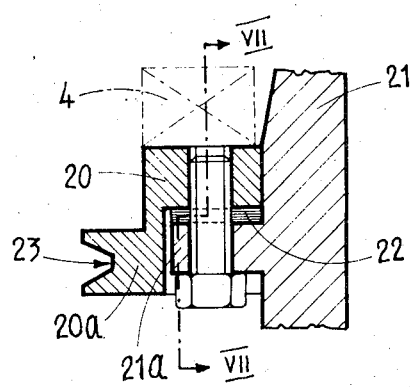
FIG. 6 is a sectional view of a part of another modification.
Figure 7:
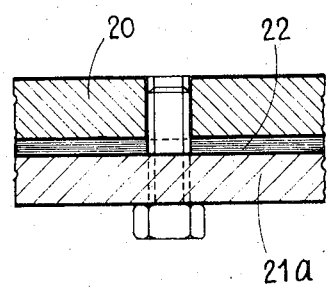
FIG. 7 is a sectional view along line VII—VII of FIG. 6.

The modification of FIG. 6 and 7 differs from that of FIG. 3 to 5 by the fact that the ring, indicated by 20, which carries the lugs 4, is locked to a shoulder 21a of the adaptor, indicated by 21, by means of an antifriction lining, e.g., made of FERODO (registered Trademark), placed between it and the shoulder 21a, which replaces the toothing 15 and 19 of the above mentioned modification.

It should be noticed that, in the modification of FIG. 6 and 7, the ring 20 is provided with a skirt having a ring-shaped groove 23 for driving an attachment of the machine-tool for changing the tools automatically.

In the modification of FIG. 8 to 10, the ring, indicated by 24, is provided, as in the first embodiment, with an internal toothing 24a meshing with a toothing 25 of the adaptor, indicated by 26. The latter has a V-shaped groove 27 into which fit the tips of two locking-screws 28, diametrically opposed to one another, for locking in place ring 24 in the position represented on FIG. 8, wherein two studs 29 of the spindle-nose 30 fit into a diametrical groove 31 contrived into the ring 24. When the two screws 28 are untightened, the ring 24 can be lowered beyond the position represented on FIG. 9 until its toothing 24a leaves the toothing 25 of the adaptor 26, which permits modifying the angular position of the ring relative to the adaptor.

In this modification as in the one of FIG. 6 and 7, the ring is provided with an external groove for driving an automatic tool changer, which groove could be omitted in case the device should be adapted to a machine having no automatic tool changer.

Figure 11:
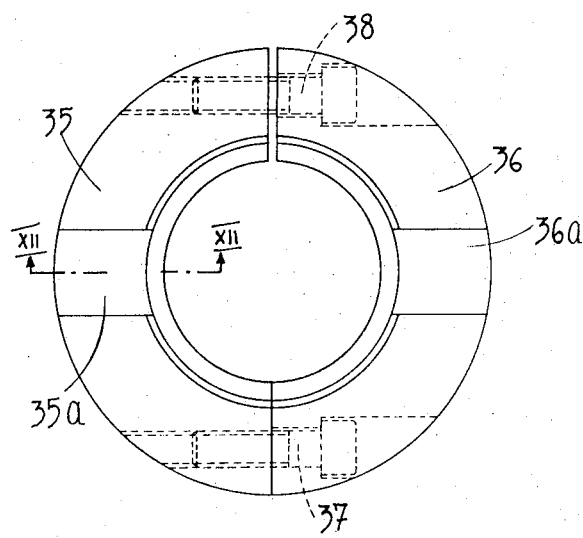
FIG. 11 is a plan view of a part of another modification.
Figure 12:
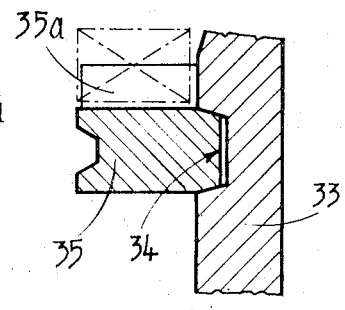
FIG. 12 is a sectional view of a detail of this modification, along line XII—XII of FIG. 11, on a magnified scale.

In the modification of FIG. 11 and 12, the adaptor, indicated by 33, is provided with a trapeze-shaped groove 34 into which partially fits a ring made of two crown-shaped segments 35 and 36. These segments extend over slightly less than 180° and rest against each other by one of their ends the latter being locked together by means of a screw 37. A screw 38 working on their other ends allows them to be locked into the groove 34 or, conversely, to be set free, breaking thus the bond between them and the adaptor 33. Each segment 35 and 36 is provided with a driving lug indicated by 35a and 36a respectively.

Figure 13:
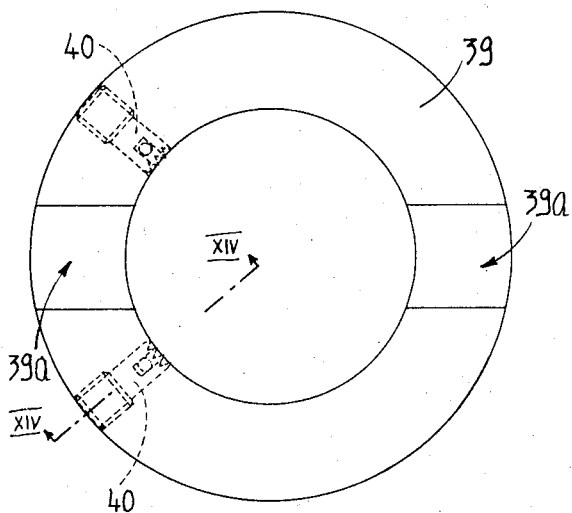
FIG. 13 is a plan view of a part of another modification.
Figure 14:
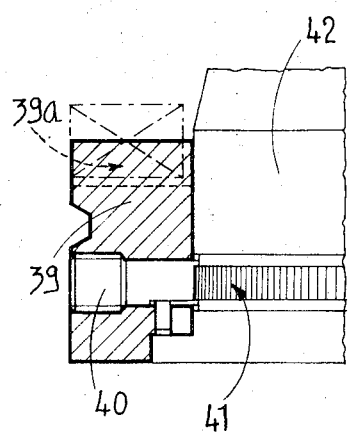
FIG. 14 is a sectional view of a detail of this modification, along line XIV—XIV of FIG. 13, on a magnified scale.

Finally, in the modification of FIG. 13 and 14, the ring, indicated by 39, comprises two locking screws 40 having a dented tip which fits into a toothing 41 of the adaptor 42. It should be noted that this toothing 41 can be very thin and that it can be machined with a knurling wheel, for instance, which machining reduces the manufacturing cost. It is enough, for angularly adjusting the position of the ring 39 relative to the adaptor 42, to untighten the two screws 40 which move permits turning the ring a desired angle, then to retighten the two screws 40. The ring has two lugs 39a which are being driven by the spindle of the machine-tool.

It should be noticed that all the embodiments described here and the modifications shown herein not only permit using compound-tools with machine-tools carrying means for laterally displacing the tool at the end of the machining operation, but also, owing to the easy replacement of the orientable ring on the adaptor, achieving, by the use of machine-tools having or not having a tool-changer, substantial cost savings, the operator having the opportunity, depending on the type of machine-tool used, to only replace the ring whenever the driving means of the spindle of the machine-tool used require it.

We claim:

1. In a machine tool having a drive spindle with a socket for receiving a tool holder assembly, said tool holder assembly comprising a tool holder and a drive ring releasably secured thereto, an axial lug on one of said spindle and drive ring, a complementary axial groove on the other of said spindle and drive ring to receive said lug for driving engagement, said tool holder including external teeth around the periphery thereof, said drive ring having complementary internal teeth to drivingly mesh with the teeth of said tool holder in any of a plurality of relative angular positions, means for releasably securing said drive ring to said tool holder and to prevent axial displacement therebetween in any of said plurality of relative angular positions, whereby said tool holder can be released and angularly relocated relative to said drive spindle without relative angular movement between the drive spindle and the drive ring.

* * * * *

UNITED STATES PATENT OFFICE
CERTIFICATE OF CORRECTION

Patent No. 3,790,296    Dated February 5, 1974

Inventor(s) Andre Mottu and Arnold Heimann

It is certified that error appears in the above-identified patent and that said Letters Patent are hereby corrected as shown below:

In the heading, insert below line 11,
 identified as [21] Appl.No.: 188,214

-- [30] Foreign Application Priority Data

Oct. 14, 1970    Switzerland.....15.217/70

Signed and sealed this 16th day of July 1974.

(SEAL)
Attest:

McCOY M. GIBSON, JR.　　　　　　C. MARSHALL DANN
Attesting Officer　　　　　　　　Commissioner of Patents